(No Model.)
J. W. EISENHUTH.
ELECTRICAL CONDUCTOR FOR TROLLEYS.
No. 523,319. Patented July 17, 1894.
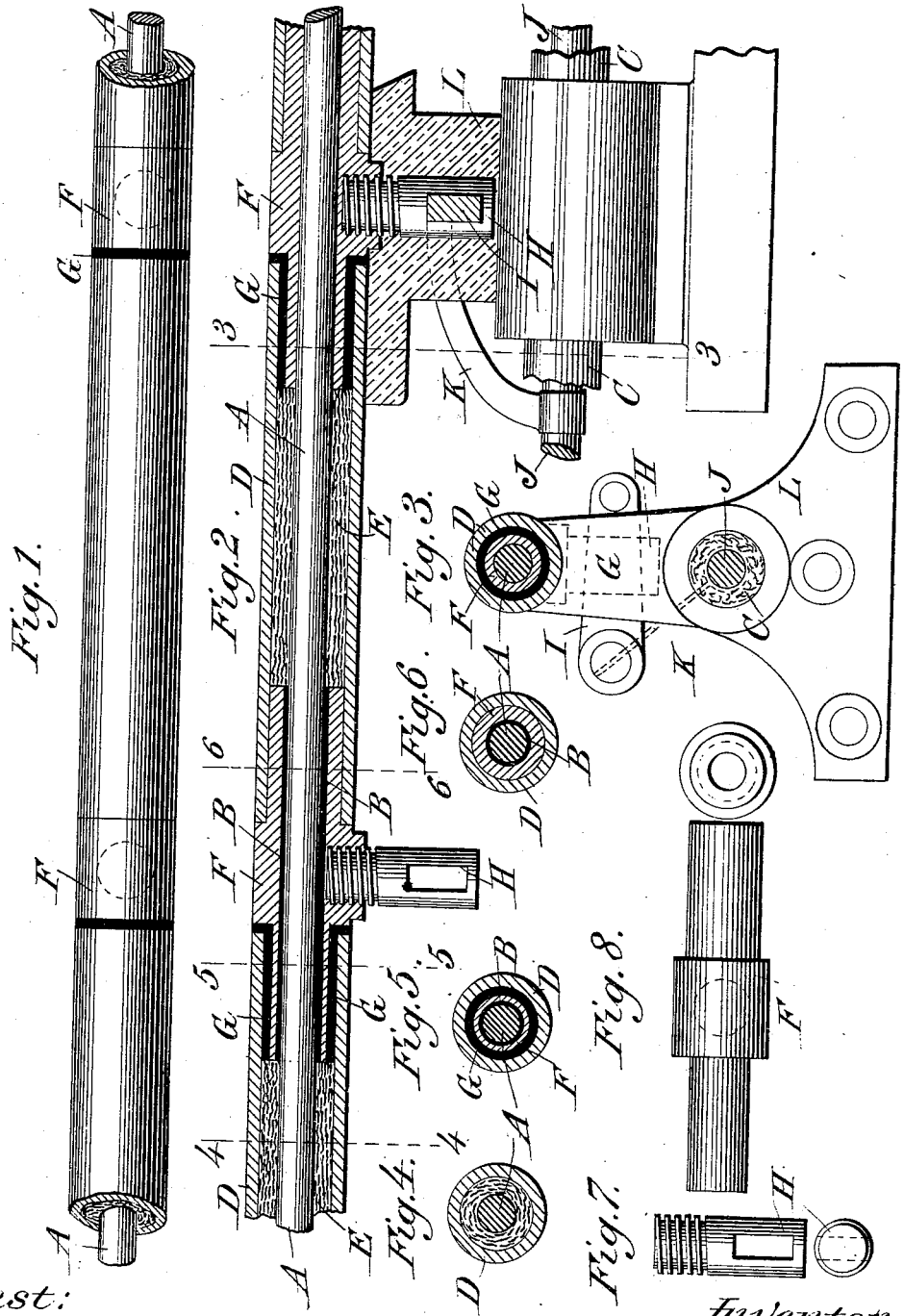
Attest:
F. H. Schott
L. D. McGinn
Inventor
John W. Eisenhuth
Mason, Fenwick & Lawrence
Attorneys

UNITED STATES PATENT OFFICE.

JOHN W. EISENHUTH, OF SAN FRANCISCO, CALIFORNIA.

ELECTRICAL CONDUCTOR FOR TROLLEYS.

SPECIFICATION forming part of Letters Patent No. 523,319, dated July 17, 1894.

Application filed June 21, 1893. Serial No. 478,412. (No model.)

*To all whom it may concern:*

Be it known that I, JOHN W. EISENHUTH, residing at San Francisco, in the county of San Francisco and State of California, have invented certain new and useful Improvements in Electrical Conductors; and I do declare the following to be a full, clear, and exact description of the invention, such as will enable others skilled in the art to which it appertains to make and use the same.

The object of my invention is to provide an improved trolley-wire for electric cars, &c., wherein the greater part of the current shall be carried in an insulated conductor and only a small portion of the current, that required for immediate use, shall be exposed. I attain this object by the mechanism hereinafter described and illustrated in the accompanying drawings.

In the drawings:—Figure 1 is a top view of a portion of my principal conductor. Fig. 2 is a vertical sectional view of the same, also showing one of the supports and a portion of my auxiliary conductor. Fig. 3 is a cross section of the same on the line 3—3 of Fig. 2. Fig. 4 is a cross section on the line 4—4. Fig. 5 is a cross section on the line 5—5. Fig. 6 is a cross section on the line 6—6. Figs. 7 and 8 are detail views.

The general conducting wire A is supported at intervals upon the brackets L by means of the collars or joints F and the slotted studs H. The studs may screw into the collars, as shown, or may be attached in any other suitable manner. The studs are securely held in the brackets by the tapered keys I. Between these collars, the conductor A is covered by the insulation E; and this is covered by the sectional tubing D, the sections of which extend from one joint or collar to the next. The trolley moves upon this tube and gets its electricity therefrom. These tubular sections may be attached directly to the collars F; or may be insulated therefrom at one end by the packing G, as shown. The tubes D and the collars F are preferably formed from some material of low conductivity; while the wire A should be of the greatest possible conductivity. By this means, the greater part of the current will be confined to the main wire and only such as may be needed for immediate use, as for the trolleys, will flow into the exterior tube. Thus, the loss of the entire current or serious accidents, as from short circuiting, will be practically impossible.

Upon long lines, it may be found better not to carry the entire current in the wire A; and, on heavy grades, it may even be found advisable to slightly increase the voltage. In all such cases, I employ an auxiliary conductor J with a continuous insulation C; and, where it is found desirable to employ the current therefrom, a small strip of metal K is inserted through the insulation, as shown, and wrapped around the end of the tapered key I. The bracket L is, of course, composed of insulating material. The current will then pass from the auxiliary conductor J to the joint F and thence to the tubular section D; and may, if desired, be kept entirely from the main conductor A by means of an insulating packing B. The auxiliary conductor may also be employed to feed several smaller circuits each similar to the above, as will be readily understood by those skilled in the art.

The tubes D should preferably be composed of some material which is not only a poor conductor of electricity but also has good wearing properties. For this purpose, I prefer an alloy of from one-third to two-thirds copper and the remainder bronze; the main conducting wire preferably being of copper.

Having thus fully described my invention, what I claim as my invention is—

1. An electric conductor for trolleys &c., comprising a main conductor and a series of short tubular conductors surrounding the main conductor and having permanent electrical connection therewith.

2. An electric conductor for trolleys &c., comprising a main conductor and a series of short tubular conductors surrounding the main conductor and having permanent electrical connection therewith but being partially insulated therefrom.

3. An electric conductor for trolleys &c., comprising a main conductor of low resistance and a series of short tubular conductors each having permanent electrical connection therewith.

4. An electric conductor for trolleys &c., comprising a main conductor, a surrounding insulation, and a series of short tubular conductors surrounding this insulation and each having permanent electrical connection with the main conductor.

5. An electric conductor for trolleys &c., comprising a main conductor, a series of short tubular conductors surrounding this, and a series of collars or joint-pieces supporting the tubular conductors.

6. An electric conductor for trolleys &c., comprising a main conductor, a series of collars thereon, and a series of short tubular conductors surrounding the main conductor and each connected at one end to a collar and insulated at the other end.

7. An electric conductor for trolleys &c., comprising a main conductor, a series of collars thereon, sections of tubular conductors supported by the collars and the slotted studs attached to the collars.

8. An electric conductor for trolleys &c., comprising a main conductor, an auxiliary conductor, and a series of short conductors some of which are connected to the one conductor and some to the other.

9. An electric conductor for trolleys &c., comprising an insulated main conductor, an insulated auxiliary conductor, and a series of short conductors some of which are connected to one conductor and some to the other.

10. An electric conductor for trolleys &c., comprising an insulated main conductor, an insulated auxiliary conductor, and a series of short tubular conductors surrounding the main conductor, some of these being connected with the main conductor and some with the auxiliary conductor.

11. An electric conductor for trolleys &c., comprising a main conductor, an auxiliary conductor, and a series of short tubular conductors surrounding the main conductor, some of these being connected with the one and some with the other.

12. An electric conductor for trolleys &c., comprising a main conductor, a series of collars thereon, a series of short tubular conductors surrounding the main conductor and connected with the collars, an auxiliary conductor, an insulating bracket supporting the conductors, and electrical connections between the auxilary conductor and some of the collars.

13. A trolley-wire comprising a main conductor and a distributing system, said distributing system comprising a series of collars on the said main conductor and a series of short tubes surrounding the main conductor and connected to the collars, said distributing system being of much less conductivity than the main conductor.

In testimony whereof I affix my signature in presence of two witnesses.

JOHN W. EISENHUTH.

Witnesses:
LEE D. CRAIG,
M. W. WESTON.